United States Patent
Shaw et al.

(10) Patent No.: US 8,246,269 B2
(45) Date of Patent: *Aug. 21, 2012

(54) METHOD OF FORMING SURFACE SEEDED PARTICULATE

(75) Inventors: Lee A. Shaw, Newport Beach, CA (US); Ronald D. Shaw, Corona del Mar, CA (US)

(73) Assignee: Lithocrete, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,751

(22) Filed: Jan. 6, 2012

(65) Prior Publication Data

US 2012/0096803 A1    Apr. 26, 2012

Related U.S. Application Data

(63) Continuation of application No. 12/970,044, filed on Dec. 16, 2010, now abandoned, which is a continuation of application No. 12/686,743, filed on Jan. 13, 2010, now abandoned, which is a continuation of application No. 12/009,208, filed on Jan. 17, 2008, now Pat. No. 7,670,081, which is a continuation of application No. 11/642,325, filed on Dec. 20, 2006, now abandoned, which is a continuation of application No. 11/295,067, filed on Dec. 6, 2005, now abandoned, which is a continuation of application No. 10/653,671, filed on Sep. 2, 2003, now abandoned, which is a continuation of application No. 10/058,912, filed on Jan. 28, 2002, now abandoned.

(51) Int. Cl.
*E01C 11/24* (2006.01)

(52) U.S. Cl. ............... 404/75; 404/72; 52/315
(58) Field of Classification Search ........... 404/72, 404/75, 17, 19, 27, 82; 52/742.1, 315
See application file for complete search history.

(56) References Cited

U.S. PATENT DOCUMENTS

| | | | | |
|---|---|---|---|---|
| 2,296,453 A | * | 9/1942 | Saffert | 264/131 |
| 2,925,831 A | * | 2/1960 | Welty et al. | 138/141 |
| 3,334,555 A | * | 8/1967 | Nagin et al. | 404/31 |
| 4,542,040 A | * | 9/1985 | Nowak | 427/196 |
| 4,662,972 A | * | 5/1987 | Thompson | 156/279 |
| 4,748,788 A | * | 6/1988 | Shaw et al. | 52/741.11 |
| 4,780,369 A | * | 10/1988 | Schnabel et al. | 428/398 |
| 5,246,650 A | * | 9/1993 | Clark | 264/87 |
| 5,494,729 A | * | 2/1996 | Henry et al. | 428/147 |
| 2010/0180528 A1 | * | 7/2010 | Shaw | 52/311.1 |

* cited by examiner

*Primary Examiner* — Raymond W Addie
(74) *Attorney, Agent, or Firm* — Stetina Brunda Garred & Brucker

(57) ABSTRACT

An improved surface seeded exposed particulate concrete and method of making the improved surface seeded exposed particulate concrete is disclosed. Small particulate is sprayed over the upper surface of the concrete. The particulate may be sprayed using a material sprayer. The particulate may be uniformly sprayed to distances exceeding twenty feet. The particulate is mixed into a cement paste derived from the concrete mixture using floats. A surface retarder is then applied to cover the concrete surface. Subsequently, any surface film is washed from the surface of the concrete and the concrete is cured. The result is a surface seeded particulate with an exposed surface that is flat and is suitable for high traffic areas. The resultant surface may resemble stone, granite or marble.

13 Claims, 1 Drawing Sheet

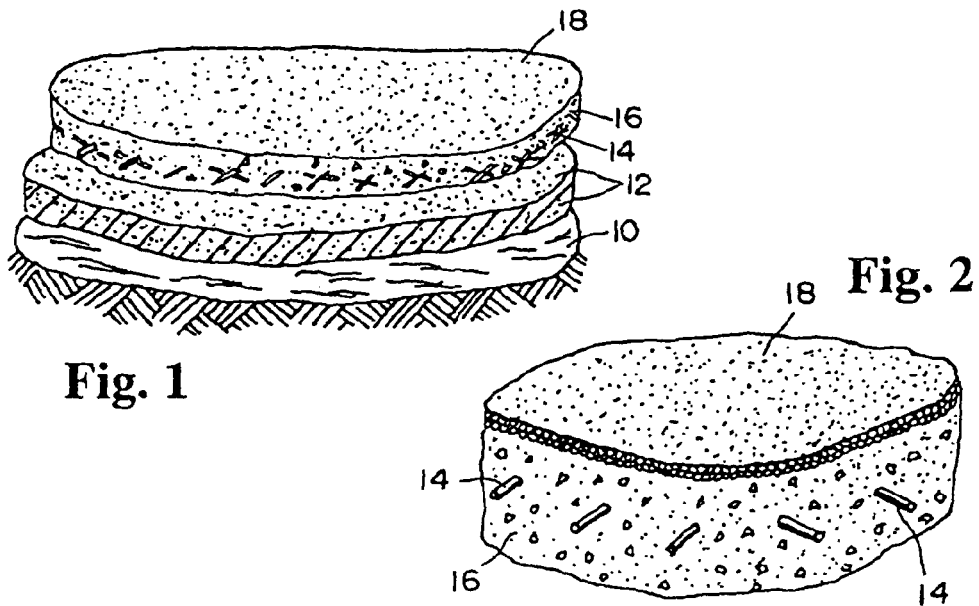
Fig. 1
Fig. 2
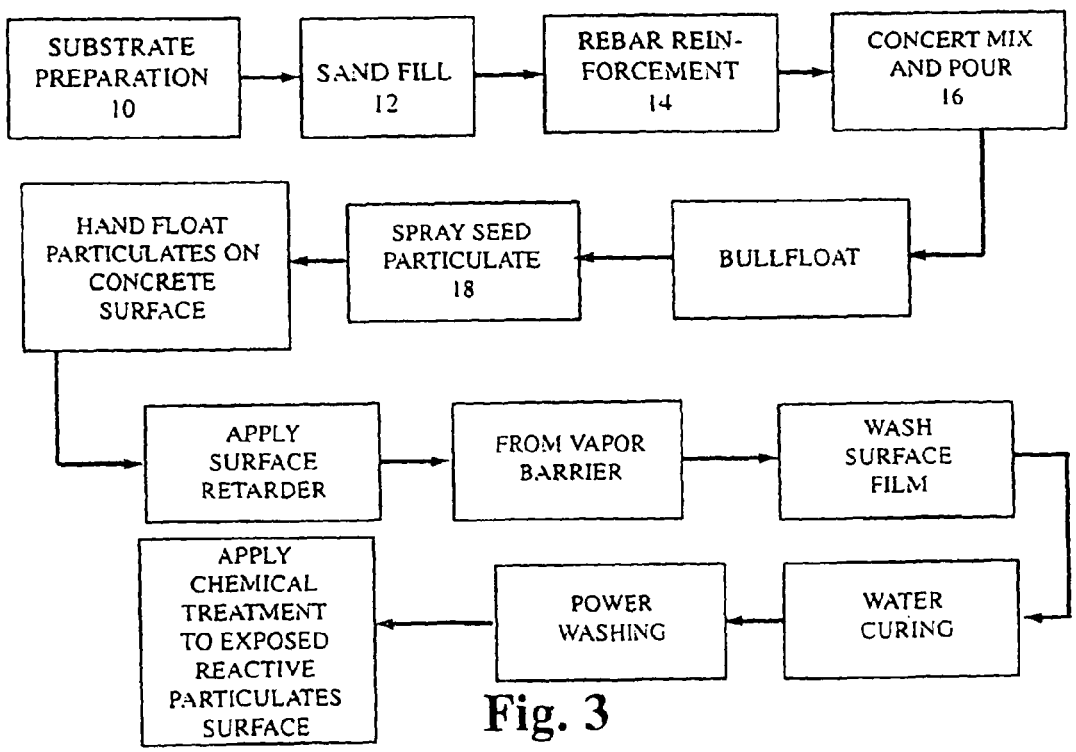
Fig. 3

METHOD OF FORMING SURFACE SEEDED PARTICULATE

CROSS-REFERENCE TO RELATED APPLICATIONS

This is a continuation patent application of U.S. patent application Ser. No. 12/970,044 filed on Dec. 16, 2010, now abandoned which is a continuation of U.S. patent application Ser. No. 12/686,743 filed on Jan. 13, 2010, now abandoned, which is a continuation of U.S. patent application Ser. No. 12/009,208 filed on Jan. 17, 2008, now U.S. Pat. No. 7,670,081 issued on Mar. 2, 2010 which is a continuation of U.S. patent application Ser. No. 11/642,325 filed Dec. 20, 2006, now abandoned which is a continuation of U.S. patent application Ser. No. 11/295,067 filed Dec. 6, 2005, now abandoned which is a continuation of U.S. patent application No. 10/653,671 filed on Sep. 2, 2003, now abandoned, which is a continuation of U.S. patent application Ser. No. 10/058,912 filed on Jan. 28, 2002, now abandoned, the entire contents of which are incorporated herein by reference.

STATEMENT RE: FEDERALLY SPONSORED RESEARCH/DEVELOPMENT (Not Applicable)

BACKGROUND OF THE INVENTION

The present invention relates in general to exposed particulate concrete, and in particular to an improved method for surface-seeding the particulates into the upper surface of the concrete.

U.S. Pat. No. 4,748,788 entitled SURFACE SEEDED EXPOSED AGGREGATE CONCRETE AND METHOD OF PRODUCING SAME, hereby incorporated by reference in its entirety, discloses a surface seeded exposed aggregate concrete characterized by the use of small, rounded aggregate, such as sand, being broadcast over the upper surface of concrete. The method disclosed results in a reduction in the size of the aggregate exposed on the surface of concrete compared to other prior art methods. The resultant surface seeded exposed aggregate concrete exhibits an extremely flat exposed aggregate surface suitable for extremely high traffic flooring applications. Additionally, the surface texture and color are able to approximate the surface color and texture of more conventional flooring surfaces, such as stone, granite and marble.

U.S. Pat. No. 6,033,146 entitled GLASS CHIP LITHOCRETE AND METHOD OF USE OF SAME, hereby incorporated by reference in its entirety, discloses a surface seeded exposed particulate concrete and method for producing same. U.S. Pat. No. 6,033,146 improves upon the surface seeded aggregate concrete and method of making same disclosed in U.S. Pat. No. 4,748,788 by disclosing a method that produces surface seeded particulate concrete that expands the colors and surface texture appearances of concrete surfaces beyond those disclosed in U.S. Pat. No. 4,748,788.

The patents described above produce surface seeded exposed particulate concrete with desirable characteristics, as evidenced by the use and extensive licensing of such products throughout the United States. However, the application of the surface seeded particulate is a timely process. Furthermore, uniformity of application is difficult to achieve for large surface areas. Typically, it is difficult to achieve a uniform application for surface areas which require broadcasting of particulate beyond a distance of ten feet from the broadcaster.

Accordingly, there is a need for an improved process for surface-seeding of the particulate into the upper surface of a very large concrete slab.

BRIEF SUMMARY OF THE INVENTION

The present invention specifically addresses and alleviates the problems described above in treating large areas of poured concrete with exposed particulates.

Aspects of the present invention may be regarded as a surface seeded exposed particulate concrete product and a method of forming the surface seeded exposed particulate concrete product. The surface seeded exposed particulate concrete has a generally flat exposed particulate surface suitable for flooring applications. The particulate may be reactable with a hydrolyzed alkali silica to form an insoluble silicate structure. For example, such a particulate may comprise glass or organic materials, such as sea shells. The alternate may also be a non-reactive particulate. For example, a non-reactive particulate may comprise coarse sand, such as Monterey Aquarium coarse sand.

The method begins by preparing a subgrade to a desired grade. A concrete mixture is poured over the subgrade. The concrete mixture is screeded to a desired grade which forms a top surface thereof. The top surface of the concrete mixture is finished with a float to seal the top surface and dispose a quantity of cement/fines derived from the concrete mixture at the top surface of the concrete mixture to form an upper surface of cement/fines concrete paste. A quantity of particulate is sprayed upon the upper surface of cement/fines concrete paste. A quantity of particulate is mixed into the cement/fines concrete paste with a float to form an exposed surface of a depth of a mixture of surface-concentrated particulate and cement/fines concrete paste. A surface retarder is applied uniformly over the exposed surface of the surface-concentrated particulate and cement/fines concrete paste. Surface films are washed from the exposed surface. The concrete mixture and paste are cured to form a cured mixture and a cured paste. The exposed surface is then washed to remove surface residue therefrom.

If the particulate is reactable with a hydrolyzed alkali silica, after the exposed surface is washed, a chemical treatment of hydrolyzed alkali silica solution is applied uniformly over the exposed surface in a quantity sufficient to penetrate only the depth of the surface-concentrated particulate and cement/fines concrete paste. The hydrolyzed alkali silica used with particulates may be a hydrolyzed lithium quartz solution. Applying of chemical treatment may cause penetration of the hydrolyzed alkali metal and silica compound into the upper surface of the concrete mixture through a distance greater than the mean diameter of the particulate.

Preferably, the particulate has a mean diameter of less than three-eighths of one inch.

The spraying the quantity of particulate is accomplished using a material gun. The spraying uniformly sprays the quantity of particulate. The spraying includes spraying some of the quantity of particulate a distance of at least twenty feet.

Applying of the surface retarder may cause penetration of the surface retarder into the upper surface of the concrete mixture through a distance greater than the mean diameter of the particulate.

The particulate may be sprayed over the upper surface of the concrete mixture at an approximate rate of one pound per square foot of concrete mixture.

Mixing may comprise using a float in a circular motion to cover the particulate with the cement/fines concrete paste.

The method may include sponging in a circular motion any areas of the upper surface of the concrete mixture after the mixing and before the applying of the surface retarder.

The washing of surface film may include applying water to the upper surface of the concrete mixture and lightly brushing the upper surface of the concrete mixture. Preferably, the lightly brushing removes no more than five percent of the particulate from the upper surface of the concrete mixture.

The washing of the upper surface of the concrete mixture to remove surface residue therefrom may comprise washing the upper surface of the concrete with a mixture of water and muriatic acid.

The method may include covering the upper surface of the concrete mixture with a vapor barrier after applying of the surface retarder and before washing surface film. The covering the upper surface of the concrete mixture with a vapor barrier may extend for a period of two to twenty-four hours.

The curing may comprise curing the concrete mixture by use of a logger or curing the concrete mixture by use of a soaker hose.

Reinforcement means may be placed upon the prepared subgrade to be disposed within the poured concrete mixture.

The pouring may comprise mixing the concrete mixture with a color additive.

After the curing, the method may include altering the surface roughness of the upper surface of the concrete mixture.

Prior to spraying particulates, the method may include washing with potable water and air drying the particulates.

The subgrade may be prepared by compacting the subgrade to approximately ninety percent compaction. Preparing the subgrade may include placing a layer of sand between the subgrade and the poured concrete mixture.

BRIEF DESCRIPTION OF THE DRAWINGS

These as well as other features of the present invention will become more apparent upon reference to the drawings wherein:

FIG. 1 is a partial cross-sectional view of the surface seeded exposed particulate concrete of the present invention;

FIG. 2 is an enlarged partial perspective view of the concrete mixture having the exposed particulate thereon; and FIG. 3 is a schematic flow diagram of the manipulative steps utilized in producing the surface seeded exposed particulate concrete of the present invention.

DETAILED DESCRIPTION OF THE INVENTION

Referring now to the drawings wherein the showings are for purposes of illustrating preferred embodiments of the present invention only, and not for purposes of limiting the same, the surface seeded exposed particulate concrete and method of producing the same is pictorially and schematically illustrated. The particulate may be potentially reactive with the concrete mixture 16. For example, the particulate 18 may comprise glass, such as silica glass, organic materials, such as sea shells of marine animals and mollusk, and other various metals and composite materials. Alternatively, the particulate 18 may be an aggregate that does not react with the concrete mixture. For example, the particulate may comprise coarse sand, such as Monterey Aquarium (Grade) coarse sand. Preferably, the particulate is characterized by having a mean average diameter size of approximately one-eighth inch diameter. The particulate may possess a rounded external surface configuration. Alternatively, the individual particulates may have an angled external surface configuration.

As is conventional, the initial step in the method of the present invention comprises the preparing of the subgrade to the desired elevation and grade and the compacting of the same to preferably 90% compaction. Subsequently, the subgrade 10 is covered with a one inch minimum thick layer of clean, moist fill sand 12. The fill sand 12 is not absolutely necessary, but it is highly desirable to control the hydration process of the concrete. Further, in order to increase the resultant strength of the concrete and inhibit subsequent cracking, reinforcement wire mesh or rebar 14 is positioned upon the bed of fill sand 12.

With the rebar 14 in place, a concrete mix or mixture 16 is poured over the fill sand 12 and rebar 14 respectively, and as is conventional is poured to approximately a three and one half to four inch thickness. Although variations in the concrete mix 16 are fully contemplated, preferably the mixture 16 comprises 70% sand and 30% three-eighth inch mean diameter particulate combined with a minimum of five sacks of cement, such as Portland cement per cubic yard. Dependent upon individual preferences, various conventional color mixtures may be added to the concrete mix.

The concrete surface is preferably struck off or screeded to the desired level plane of the concrete surface. However, the mix is preferably not tamped as is conventional, as Applicants have found tamping brings up too many sand fines in most concrete mixes, which would interfere with the subsequent surface seeding of the exposed particulate thereupon. Rather, subsequent to screeding the concrete surface, the surface is floated using a conventional bull float, which may be manufactured of fiberglass, wood, magnesium, or the like. Such floats are characterized by possessing an extremely smooth surface which tends to seal the top surface of the concrete mix 16 and bring out appropriate amounts of cement paste for the subsequent steps of the present invention.

When the upper surface of the concrete mix 16 is still plastic, small size exposed particulate 18 is sprayed over the top surface of the concrete mix 16. An industrial sprayer, such as a Goldblat material sprayer or a sand blaster may be used to spray the exposed particulate. Use of such a spraying device allows for the uniform placement of the particulate over large surface areas. For example, the particulate can be uniformly sprayed for distances of about twenty to twenty-four feet from the sprayer as compared to traditional methods of broadcasting the particulate (e.g., manually) which can only achieve uniformity for a distance of about eight to ten feet away from the person broadcasting the particulate.

Depending on the particulate used, it may be desirable to wash the particulate with potable water and air dry it prior to spraying the particulate on the plastic concrete surface. The particulate 18 should not initially depress below the top surface of the concrete mix 16 but rather, should be sprayed solely to cover the same.

After the spraying of the particulates 18, the particulates are then floated into the plastic upper surface of the concrete mix 16 using floats, for example, a fiberglass, wood or magnesium float. The mixing of the particulates 18 with the sand cement paste is critical as it ensures that the particulates 18 are thoroughly adhered or bonded to the top surface of the concrete mix 16 upon resultant curing. Hand sponges may then be used in a rotary fashion to further coat the surface seeded particulates 18 with the sand cement paste of the concrete mix 16. The entire surface is then finished with steel trowels.

When the resultant particulate 18 and concrete surface 16 has sufficiently set such that a finger impression not in excess of three-eighths of an inch deep is made upon manually pressing with the fingertips thereupon, a conventional surface retarder, preferably a citric acid based surface retarding agent, is spread to uniformly cover the top surface of the concrete mix 16. The surface retarder slows down the hydration process of the concrete by penetrating the top surface of the concrete mix to a depth of approximately one-eighth inch.

After the uniform coverage of the surface retarder thereon, the top surface of the concrete mix 16 is covered with either a plastic sheathing membrane or a liquid evaporation barrier, maintained thereupon for a period of approximately two to twenty-four hours. After about four hours, the surface can usually support a workman without leaving an impression, and the sheathing is removed and the top surface may be loosened with clean wet sponges working in a circular fashion, revealing the top surface of the embedded particulate 18. The surface is then washed with clean water at low pressure and the heavy latents removed with a soft broom. The washing procedure and light bristle brushing preferably removes no more than five percent of the particulate 18 from the top surface of the concrete mix 16. Subsequent to the washing, the concrete mix 16 is cured for a minimum of seven days with water only by use of a conventional fogger or soaker hose. Craft paper or liquid membrane cures may be used in place of water as job conditions dictate. Preferably after curing for a minimum of seven days, the surface is subject to conventional power washing using 3,000 PSI water pressure at a temperature of approximately 220° F. A mixture of 10-50% muriatic acid is preferably introduced into the hot water wash. The entire surface is then flushed with clean hot water. Preferably 28 days after the initial concrete placement, the surface is again washed with the high pressure/hot water wash to remove any efflorescence or discoloration from the surface. Sandblasting, acid etching or grinding and polishing may also be used to create texture variations on the surface.

If the particulate is reactable with a hydrolyzed alkali silica to form an insoluble silicate structure, after the final washing of the concrete, the top surface is treated with a hydrolyzed alkali silica solution, preferably lithium quartz sealer (approximately 12.5% lithium compound by volume). Other members of the alkali family of metals which may be suitable include sodium, potassium, rubidium, sesium, and francium. Other abundant silicone containing materials which may be suitable include feldspars, amphiboles or pyroxenes, and mica. The SINAK HLQ sealer is applied in light even coats using a sprayer or brush to a surface having a temperature between 50°-100° F. The hydrolyzed lithium quartz sealer penetrates the top surface of the concrete mix 16, again to a depth of approximately one-eighth of an inch. The chemical treatment reacts with the mineral compounds or silicious materials within the concrete mix. The reaction causes formation of an insoluble silicate structure, which acts as a protective barrier, reducing the permeability of the surface to water. Applicant believes that minimizing the addition of moisture over time minimizes the undesired expansion and cracking, even given some chemical reaction in the concrete involving the potentially reactive particulates. Applicant also believes that minimizing the addition of moisture minimizes the scope of the chemical reaction involving the non-inert particulates. Of course, this chemical treatment may be omitted when non-reactive particulates are used.

The resultant surface seeded exposed particulate concrete besides exhibiting an extremely flat exposed particulate surface suitable for pedestrian and vehicular paving applications, is also not subject to deterioration from the chemical reaction from the non-inert particulates and minerals and silicates found in the concrete mix 16. The surface texture and color approximates conventional flooring surfaces such as terrazzo, or ceramic tile, and this resemblance may be further accentuated by cutting the concrete surface into rectangular or irregular grids. The present invention comprises a significant improvement in the art by providing surface seeded exposed particulate concrete, wherein a large variety of exposed particulates not necessarily chemically inert may be introduced into the upper cement surface of the concrete mixture.

Although the invention has been described with reference to a specific embodiment, this description is not meant to be construed in a limiting sense. Various modifications of the disclosed embodiment as well as alternative embodiments of the invention will become apparent to one skilled in the art upon reference to the description to the invention. It is therefore contemplated that the appended claims will cover any modifications of the embodiments that fall within the true scope of the invention.

What is claimed is:

1. A method of producing surface seeded exposed particulate concrete utilizing a material spraying device to enable spraying of particulate at distances greater than ten feet from a sprayer, the concrete generally covering a large surface area greater than 10'×10' and having a generally flat exposed particulate surface suitable for flooring applications, the method comprising:
   a) providing particulate having a mean diameter size of about ⅜";
   b) preparing a subgrade to a desired grade;
   c) pouring a concrete mixture over the subgrade, the concrete mixture defining a generally horizontal upper surface;
   d) while a finger impression can still be made in the upper surface of the concrete mixture and the material spraying device is remote from the upper surface to be sprayed, continuously spraying the quantity of particulate with the material spraying device through air upon the upper surface of concrete mixture until the large surface area greater than 10'×10' is covered with particulate;
   e) distributing the provided particulate upon the upper surface of the concrete mixture with the material spraying device wherein a level of uniformity of the distributed particulate is greater for the material spray gun than by shovel when particulate is distributed over the wide surface area greater than 10'×10'.

2. The method of claim 1 wherein the continuously spraying step is performed while the concrete mixture is still in a plastic state.

3. A surface seeded exposed particulate concrete product formed by the method of claim 1.

4. The method of claim 1 wherein at least some of the particulates are visibly exposed.

5. The method of claim 1 wherein the spraying step comprises the step of continuously spraying the quantity of particulate through air upon the upper surface of the concrete mixture greater than ten feet from the sprayer utilizing a continuous material spraying device.

6. The method of claim 1 wherein the spraying step is performed with a motor driven material spraying device.

7. The method of claim 1 wherein the spraying step comprises the step of continuously spraying the quantity of particulate with the material spraying device until the quantity of particulate evenly covers more than the 10'×10' concrete surface area.

8. The method of claim 1 wherein the particulate is selected from the group consisting of organic materials, seashells, course sand and Monterey Aquarium course sand.

9. The method of claim 1 wherein the providing step includes the step of providing particulate having a mean diameter size of about ⅛".

10. A method of producing surface seeded exposed particulate concrete utilizing a material spraying device to enable spraying of particulate at distances greater than ten feet from a sprayer, the concrete generally covering a large surface area greater than 10'×10' and having a generally flat horizontal exposed particulate surface suitable for flooring applications, the method comprising:
   a) providing particulate having a mean diameter size of about ⅜";
   b) preparing a subgrade to a desired grade;
   c) pouring a concrete mixture over the subgrade, the concrete mixture defining a generally horizontal upper surface;
   d) while a finger impression can still be made in the concrete mixture and the material spraying device is remote from the upper surface to be sprayed, continuously spraying the quantity of particulate with the material spraying device through air upon the upper surface of concrete mixture until the large surface area greater than 10'×10' is covered with particulate;
   e) redirecting the material spraying device to uniformly distribute the provided particulate upon the upper surface of the concrete mixture with the material spraying device.

11. The method of claim 10 wherein a level of uniformity of the distributed particulate over the wide surface area greater than 10'×10' is equal to or greater than a level of uniformity when the particulate is distributed by shovel over a small surface area less than 10'×10'.

12. The method of claim 10 wherein the particulate is distributed over the generally horizontal upper surface at a rate of approximately one pound per square foot.

13. The method of claim 10 wherein the continuously spraying step is performed while the concrete mixture is still in a plastic state.

* * * * *